United States Patent [19]

Smith et al.

[11] 4,292,174

[45] Sep. 29, 1981

[54] FILTER AND COOLING APPARATUS FOR DRY-CLEANING SYSTEMS

[76] Inventors: James D. Smith, 5741 Mission Blvd., Space 33, Riverside, Calif. 92504; Richard Paul, 5400 Montgomery St., Riverside, Calif. 92503

[21] Appl. No.: 155,419

[22] Filed: Jun. 2, 1980

[51] Int. Cl.³ .................. B01D 35/02; B01D 35/18
[52] U.S. Cl. ............................ 210/167; 210/186; 210/196
[58] Field of Search .............. 210/184, 186, 195 R, 210/196, 167

[56] References Cited

U.S. PATENT DOCUMENTS 2,836,045  5/1958  Smith ........................... 210/184 X
3,163,028  12/1964  De Pas et al. ................. 210/184

OTHER PUBLICATIONS

Chemical Engineers Handbook by Perry, pp. 15-16, 1963, McGraw Hill Book Co.

Primary Examiner—John Adee
Attorney, Agent, or Firm—Francis X. LoJacono

[57] ABSTRACT

An improved combination filter-and-cooling apparatus incorporated within a dry-cleaning operation, wherein the cleaning fluid or solvent is filtered and cooled within substantially closed flow systems, the apparatus being defined by a dual-chambered housing having a water-cooling chamber and a filter chamber, the filter chamber being adapted to receive at least one filter through which the solvent passes before returning to the clothes-cleaning device, and the water-cooling chamber being defined by an annular water jacket which is provided with a continuous flow of water therethrough.

4 Claims, 5 Drawing Figures

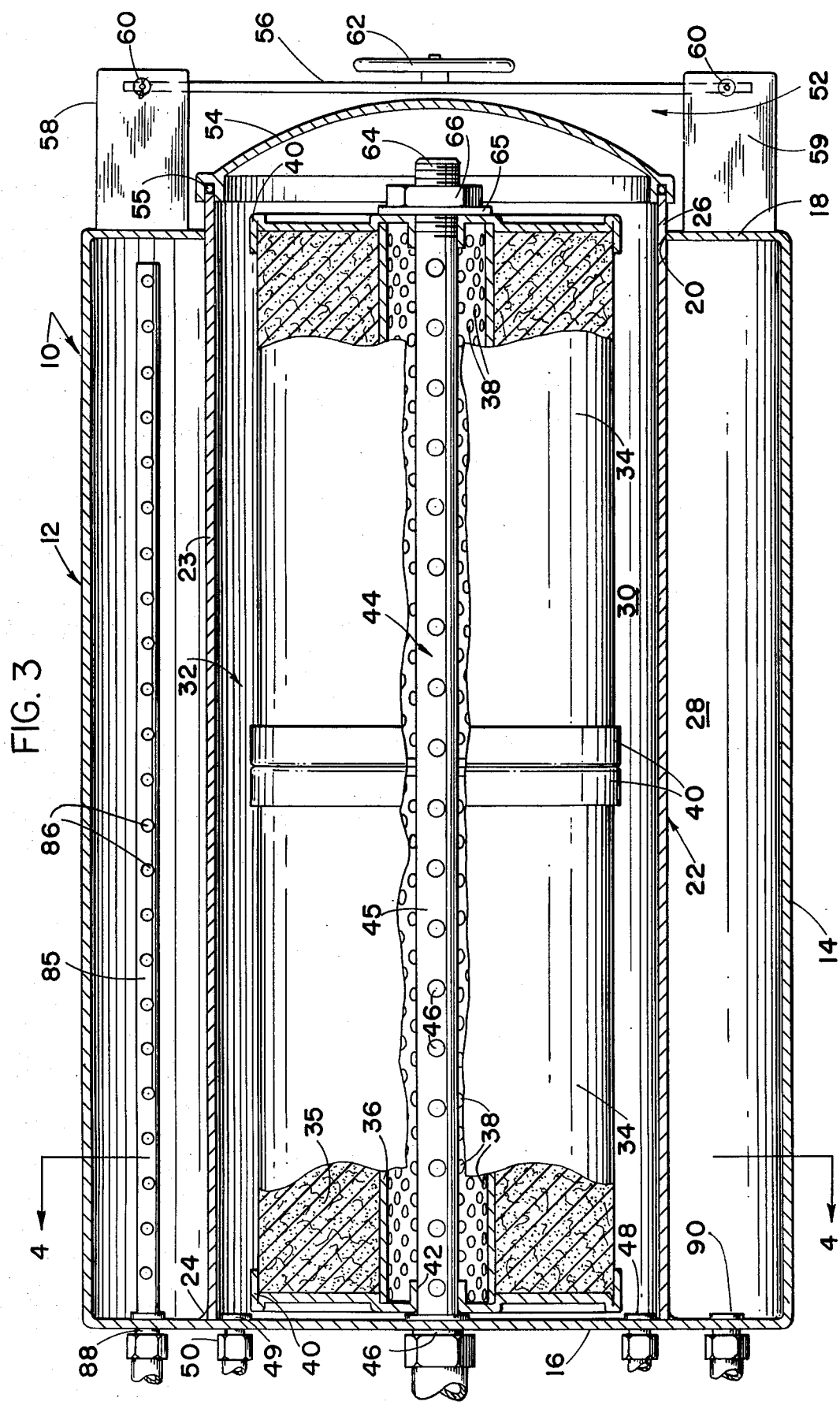

FILTER AND COOLING APPARATUS FOR DRY-CLEANING SYSTEMS

BACKGROUND OF THE INVENTION

This invention relates to dry-cleaning systems generally used in commercial establishments, and more particularly to the filtering and cooling of the cleaning solvent employed therein.

DESCRIPTION OF THE PRIOR ART

As is well known in the art, various problems and difficulties are encountered in providing suitable means for filtering and cooling cleaning solvents as they are continuously recirculated through a dry-cleaning system of the type found in commercial cleaning establishments.

Several types of filtering devices have been tried, but they have features that restrict their use and their ability to comply with the various environment-protective regulations. At present, the known devices or cleaning apparatuses have a high vapor loss which requires a greater consumption of solvent material. This is often caused by the high-temperature levels to which the solvent is exposed during operating cycles. Such vapor loss also establishes an unnecessary ozone contamination.

SUMMARY OF THE INVENTION

In accordance with the present invention, a new and improved filter and cooling apparatus for dry-cleaning fluids and/or solvents is provided which is suitable for incorporating within known commercial dry-cleaning operations which include a dry-cleaning machine to receive clothing or other articles to be cleaned therein, the machine being adapted to receive a continuous flow of the cleaning fluid within a substantially closed circulating system. The substantially closed solvent-circulating system includes a fluid reservoir, a pump, the filter and cooling apparatus, and the dry-cleaning machine—all sequentially interconnected. A cooling system is further provided which includes a water-cooling tower having a pump to circulate cooled water through the filter apparatus and back to the cooling tower.

Therefore, it is an important object of the present invention to provide a combination filter-and-cooling apparatus for a dry-cleaning system, whereby the cleaning solvent can be filtered under controlled lower temperatures so that vaporization is prevented—thus providing a lower fluorocarbon contamination.

It is another object of the invention to provide a combination filter-and-cooling apparatus that improves solvent-cleaning ability by maintaining a relatively even low temperature of 58° to 63°, rather than the average 95° to 98° temperature of known systems—the lower temperatures thus preventing solvent-fluid loss and allowing the solvent to absorb more moisture. The present apparatus reduces the average fluid loss from 40 gallons every two weeks to approximately 5-8 gallons every two weeks.

It is a further object of the invention to provide an apparatus of this character having relatively few operating parts.

It is still another object of the invention to provide an apparatus of this character that is easy to service and maintain.

Still another object of the present invention is to provide a device of this type for commercial cleaning systems that is relatively inexpensive to manufacture, and is simple and rugged in construction.

The characteristics and advantages of the invention are further sufficiently referred to in connection with the accompanying drawings, which represent one embodiment. After considering this example, skilled persons will understand that variations may be made without departing from the principles disclosed; and we contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 3 is a longitudinal cross-sectional view of the apparatus taken substantially along line 3—3 of FIG. 2, showing a pair of filter units positioned therein;

DESCRIPTION OF THE PREFERRED EMBODIMENT

Figure 1:
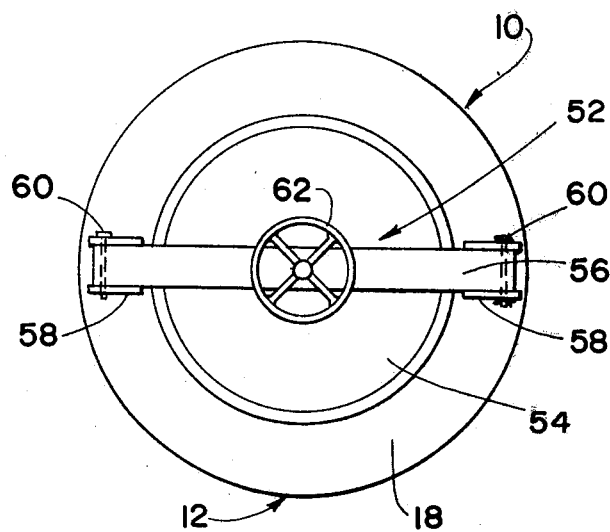
FIG. 1 is an elevational view of the end of the filter-and-cooling apparatus that includes the sealing door for the filtering compartment.
Figure 2:
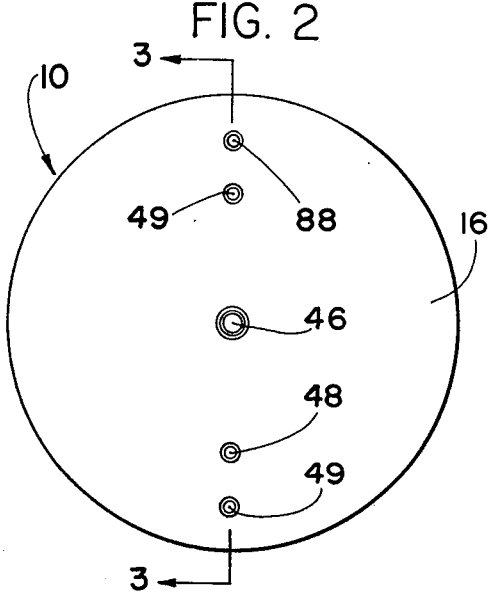
FIG. 2 is an end-elevational view thereof, showing the inlet and outlet passages formed therein.
Figure 4:
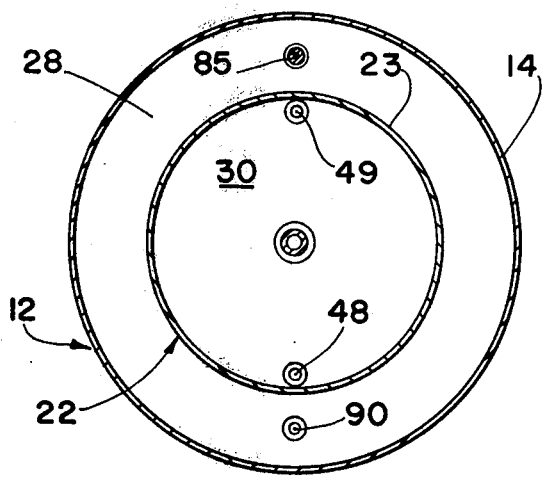
FIG. 4 is a cross-sectional view taken substantially along line 4—4 of FIG. 3, without the filter units therein.

Referring more particularly to the drawings by character references, FIGS. 1, 2, 3 and 4 disclose a filter and cooling apparatus, generally indicated at 10, adapted for use in dry-cleaning systems wherein fluid solvents are employed to clean clothing and other articles suitable for this type of cleaning.

There is shown in FIG. 3 a substantially longitudinal cross-section of the apparatus which has a dual-chambered housing 12 of a generally cylindrical configuration. The housing 12 is formed with an elongated outer annular wall 14 and a front vertical wall 16. A rear wall 18 is provided which includes a central opening 20.

Mounted within housing 12 is a second inner housing 22 defined by a smaller-diameter annular wall 23 and arranged to be affixed to the front wall 16 in any suitable manner, such as welding 24. The opposite end of second housing 22 extends through opening 20 and outwardly from wall 18, thus defining an open end thereof to provide an annular lip portion 26. Again, wall 23 is secured to rear wall 18 of housing 12 by welding or other suitable means.

Accordingly, a water-cooling jacket is formed by housing wall 14 which defines a cooling chamber 28 between outer housing 12 and inner housing 22. The area within inner housing 22 further defines a second chamber referred to as a filter chamber 30. Thus, cooling chamber 28 is substantially sealed from filter chamber 30, so that cooling fluid circulating in cooling chamber 28 is sealed from filter chamber 30, and vice versa.

Figure 5:
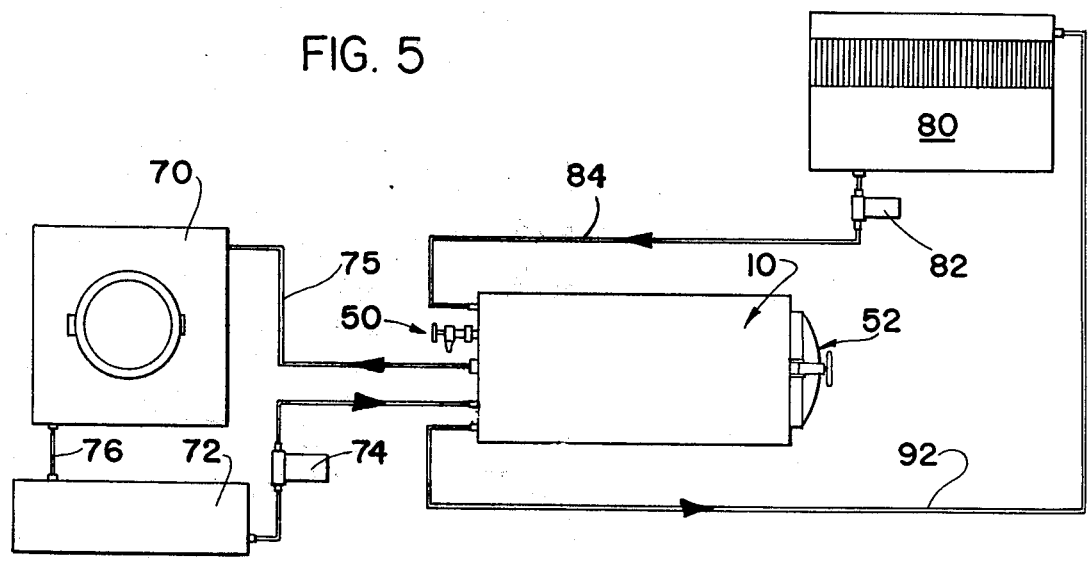
FIG. 5 is a diagrammatic view of a substantially closed cleaning-and-cooling system including the present apparatus therein.

Thus, filter chamber 30 is adapted to receive filter means, indicated generally at 32, which comprises at least one filter cartridge—but preferably a pair of cartridges 34 as shown in FIG. 3. There are several known cartridges for filtering solvent material of the type used in dry-cleaning systems; and these basically comprise a filter material 35 surrounding a central tubular core 36 having a plurality of holes 38 and end covers 40, each having a central aperture 42 so as to be mounted to a support means within filter chamber 30. The support means also defines a discharge means, generally indicated at 44, which comprises an elongated pipe 45 having a plurality of inlet holes 46 disposed along the length thereof to receive therethrough filtered solvent as it enters the central core 36 of filters 34. Pipe 45 is secured to front wall 16 of housing 12 by means of fitting 46 and extends longitudinally outward, terminating adjacent the open end of filter chamber 30. This arrangement allows for one or more filter cartridges to be supported on pipe 45, the cartridges 34 having a smaller diameter than the inside diameter of the second inner housing 22. Thus, a continuous free flow of fluid or solvent is allowed to enter chamber 30 through inlet port 48, and to circulate around chamber 30 and into the filter material 35, so as to be filtered prior to being discharged through pipe 45. Also disposed in wall 16 is a bleed or drain outlet 49 which is provided with a discharge-valve means 50 (better seen in FIG. 5).

A closure means is mounted to the rear of the filter housings 12 and 22. This closure means, generally designated at 52, is defined by a removable hatch member 54 having an annular sealing edge 55 adapted to receive annular lip 26 of housing 22. Various arrangements can be provided to removably secure hatch member 54 over the open end of chamber 30; however, in FIG. 3 hatch member 54 includes a hinged bar 56 which is mounted to a pair of oppositely disposed ear members 58 and 59 by means of pins 60, one pin being removable therefrom. To lock hatch 54 in a sealed position, a locking means is arranged between the hatch and the bar 56, the locking means comprising a locking wheel 62. Hence, as the wheel is rotated in one direction, it seals hatch 54 to housing 22; and, when rotated in the opposite direction, the hatch is separated therefrom, allowing one of the pins 60 to be removed, whereby the hatch is disengaged and moved to permit the changing of filters 34.

It should be noted that support pipe 45 is formed with a threaded free end 64 on which a washer 65 and a nut 66 are mounted, so as to hold filters 34 in place.

Thus, when the cleaning system is in operation, clothes or other articles to be cleaned are placed within a dry-cleaning machine 70. Cleaning solvent of a suitable type is pumped from reservoir 72 by pump means 74 into filter chamber 30 (see FIG. 5), wherein the solvent is filtered by the cartridges 34, and then passes through pipe 45 and into the dry-cleaning machine 70, pipe 45 and machine 70 being interconnected by flow line 75. After the operation of machine 70, the solvent draws back into reservoir 72 through flow line 76.

Referring now to the cooling system, water is pumped from the cooling tower 80 (which can be of any known suitable type) by water-pump means 82 connected by water line 84 to the cooling jacket or chamber 28. Positioned within cooling chamber 28 is a discharge nozzle 85, shown in FIG. 3 as an elongated pipe having a plurality of discharge openings or holes 86, one end thereof being secured to wall 16 and including a fitting 88 to receive line 84.

Oppositely positioned from nozzle 85 in wall 16 is an outlet port 90 which is connected by return-flow line 92 to cooling tower 80. As the solvent is filtered within chamber 30, the constant circulation of cool water through cooling chamber 28 causes the solvent to maintain a temperature between 58° and 63°, whereby vaporization of the solvent is prevented and more moisture is absorbed therein.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and we do not wish to be restricted to the specific form shown or uses mentioned, except as defined in the accompanying claims.

We claim:

1. A filter-and-cooling apparatus for liquid solvents used in a dry-cleaning process for clothes and other articles, said apparatus having a substantially closed solvent-flow system and a substantially closed water-cooling system, wherein the apparatus comprises:
   a first housing having closed ends, and including an inlet port and an outlet port;
   a cooling chamber adapted to receive a continuous flow of water therethrough, said chamber defining a water jacket;
   a second housing positioned within said first housing and having a closed end and an open end, a filter chamber being defined therein and adapted to receive a continuous flow of solvent therethrough, said water jacket being formed about said filter chamber;
   a second inlet port mounted in said closed end of said second housing;
   an elongated nozzle connected to said inlet port of said first housing, whereby incoming cooling water is discharged throughout said cooling chamber, and wherein said inlet and outlet ports of said first housing are connected within said closed water-cooling system;
   means for closing and sealing off said open end of said filter chamber;
   means for filtering said solvent, said means being positioned within said sealed filter chamber;
   a discharge means mounted in said sealed filter chamber and adapted to support said filter means therein, wherein said discharged means and said support for said filter comprise an elongated pipe member centrally positioned within said sealed filter chamber, said pipe including a plurality of holes therein to receive said filtered solvent after passing through said filter means.

2. A filter-and-cooling apparatus as recited in claim 1, wherein said means for closing and sealing said filter chamber comprises:
   a hinged hatch cover;
   means for hinging said hatch cover to said apparatus; and
   a locking means attached to said hatch cover to lock said hatch to the open end of said filter housing.

3. A filter-and-cooling apparatus as recited in claim 2, wherein said pipe includes a threaded free end adapted to receive a nut and a washer thereon, to secure said filter means on said pipe.

4. A filter-and-cooling apparatus as recited in claim 1, wherein said water system includes;
   a cooling tower;
   a pump means interconnected between said cooling tower and said inlet port of said cooling chamber; said pump disposed within a first flow line; and a second flow line interconnected between said outlet port of said cooling chamber and said cooling tower, and wherein said solvent-flow system includes a dry-cleaning machine interconnected to said discharge pipe of said filter chamber;

a reservoir connected to said dry-cleaning machine to receive solvent therefrom; and pump means connected between said reservoir and said filter chamber to provide continuous flow through said solvent system.

* * * * *